United States Patent
Nagaeda et al.

(10) Patent No.: US 8,054,524 B2
(45) Date of Patent: Nov. 8, 2011

(54) OPTICAL AMPLIFIER

(75) Inventors: Hiroshi Nagaeda, Sapporo (JP); Yoichi Oikawa, Sapporo (JP); Noriyasu Shiga, Sapporo (JP); Yoshiaki Horiuchi, Sapporo (JP)

(73) Assignee: Trimatiz Ltd., Chiba (JP)

( * ) Notice: Subject to any disclaimer, the term of this patent is extended or adjusted under 35 U.S.C. 154(b) by 31 days.

(21) Appl. No.: 12/602,341

(22) PCT Filed: May 30, 2008

(86) PCT No.: PCT/JP2008/060005
§ 371 (c)(1),
(2), (4) Date: Nov. 30, 2009

(87) PCT Pub. No.: WO2008/146910
PCT Pub. Date: Dec. 4, 2008

(65) Prior Publication Data
US 2010/0134862 A1 Jun. 3, 2010

(30) Foreign Application Priority Data

May 31, 2007 (JP) ................................. 2007-169730

(51) Int. Cl.
*G02B 26/00* (2006.01)
*G02F 1/01* (2006.01)
*H01S 3/00* (2006.01)
(52) U.S. Cl. ......................... 359/239; 359/276; 359/333
(58) Field of Classification Search .................. 359/239, 359/245, 238, 248, 344, 337, 276, 333
See application file for complete search history.

(56) References Cited

U.S. PATENT DOCUMENTS

| | | | |
|---|---|---|---|
| 6,690,506 B2* | 2/2004 | Zahnley et al. | 359/337.11 |
| 2005/0007136 A1* | 1/2005 | Feder et al. | 324/760 |
| 2007/0201784 A1* | 8/2007 | Kissa et al. | 385/8 |
| 2008/0239470 A1* | 10/2008 | Nishihara et al. | 359/337.1 |
| 2010/0157415 A1* | 6/2010 | Okrog | 359/333 |

FOREIGN PATENT DOCUMENTS

| | | |
|---|---|---|
| JP | 5-241209 | 9/1993 |
| JP | 7-212315 | 8/1995 |
| JP | 2001-94181 | 4/2001 |

(Continued)

OTHER PUBLICATIONS

JP 2002-118316, translation Feb. 2002.*

(Continued)

*Primary Examiner* — William Choi
(74) *Attorney, Agent, or Firm* — Osha • Liang LLP

(57) ABSTRACT

A high-speed optical amplifier is considered to be an important optical device because of an increasing demand of routing, which is accompanied by an increase in complexity of networks. It is difficult to satisfy a response performance by related-art techniques, and there has been a problem in achieving a high-speed response performance of 10 microseconds or less.

An optical amplifier according to the present invention includes: an input monitor means 500; an optical amplification means 310 including an optical amplification medium 300, and a control means 400 for performing feed-forward control. When the optical amplification means is controlled by the feed-forward control in response to a signal of the input monitor means 500, an overshoot signal is applied as a control signal so that a slow response performance specific to the optical amplification medium has been improved, and thereby high-speed response performance has been achieved.

15 Claims, 8 Drawing Sheets

FOREIGN PATENT DOCUMENTS

| | | | |
|---|---|---|---|
| JP | 2002-118316 | * | 4/2002 |
| JP | 2002-118316 A | | 4/2002 |
| JP | 2002-533969 A | | 10/2002 |
| JP | 2004-175280 | | 6/2004 |
| JP | 3811630 | | 6/2006 |
| WO | 2005/121876 | | 12/2005 |

OTHER PUBLICATIONS

International Search Report for International Application No. PCT/JP2008/060005, mailed on Jul. 1, 2008 (4 pages).

Office Action in Chinese Application No. 200880101509.8, Issued Dec. 31, 2011 (5 Pages With English Translation).

* cited by examiner

RESPONSE SIGNAL OF OPTICAL
AMPLIFICATION MEANS
(OUTPUT OPTICAL SIGNAL)

OUTPUT OPTICAL SIGNAL
AFTER HAVING PASSED
THROUTH HIGH-SPEED
OUTPUT VARIABLE MEANS

OPTICAL AMPLIFIER

TECHNICAL FIELD

The present invention relates to an optical amplifier and to a method of controlling an optical amplifier.

BACKGROUND ART

In a Wavelength Division Multiplexing (WDM) communication network, a network configuration is being changed from a point-to-point network to a ring network using Reconfigurable Optical Add-drop Multiplexer (ROADM) nodes in a backbone line system and a metro core system.

A fixed wavelength signal is assigned for add/drop at each ROADM node, and it has become technically indispensable to remotely change the number of wavelengths at trouble time, or at the time of increasing/decreasing a channel.

In this case, the number of input signals is changed. Accordingly, for an erbium-doped fiber amplifier (Er-Doped Fiber Amplifier: EDFA) disposed in an ROADM, it is requested to perform optical-amplification-gain constant control (Automatic Gain Control: AGC) such that each signal level will not be changed even if the number of signals is changed, which is different from optical-output constant control (Automatic Level Control: ALC) normally used in a system not using an ROADM.

For AGC-EDFAs performing this control, amplifiers following input variations of a few milliseconds have been already in practical use because the speed of a change in the number of wavelengths is a few milliseconds.

In a next-generation ring network, it is requested to effectively utilize wavelength resources in order to meet an increase in traffic. Thus, for an ROADM, it is necessary to employ a dynamic ROADM which is capable of dynamically changing the number of wavelengths in response to transitional variations of the communication capacity. In this case, for an AGC-EDFA, it is necessary to have a response of about 10 microseconds.

To date, there has been a report on a response of a few hundred microseconds. However, in order to achieve a higher-speed ROADM, it is requested to increase the speed further.

Also, further, in an Optical Burst Switching (OBS) system dynamically changing paths of a burst signal, it becomes necessary to have an AGC-EDFA having a response of 10 microseconds or less.

In this manner, there have been increasing demands for a higher speed of 10 microseconds or less, and thus an AGC-EDFA has become a key device in a next-generation network.

For a configuration and control of an AGC-EDFA, it is thought that there are (1) Feedback (FB) control of EDF, (2) Feed-forward (FF) control of EDF (Japanese Patent No. 3811630), and (3) Combination control of FF control and FB control.

Also, for a configuration of an EDFA, there is an example of a configuration combined with a variable optical attenuator (Variable Optical Attenuator: VOA) (Japanese Patent Application Laid-open No. 7-212315).

Patent Document 1: Japanese Patent No. 3811630
Patent Document 2: Japanese Patent Application Laid-open No. 7-212315

DISCLOSURE OF INVENTION

Problems to be Solved by the Invention

In a method of controlling an EDF, singly, by FF control, FB control, or the combination control thereof, including Patent Document 1, it is not possible to eliminate slow recombination velocity specific to the EDF, and thus it is not suitable for speeding up. Accordingly, under the related-art driving condition, there has been a limit to improve transitional response performance.

Also, there have been methods of using an EDF and a VOA as described in Patent Document 2. However, the purpose of a VOA is to vary a steady output level of an EDF, and controlling of a transitional response depends only on the control of EDF. Thus, it has been difficult to make a high-speed response in the same manner as controlling an EDF singly.

In view of the above circumstances, the present invention has been made in order to achieve an improvement in speed of an AGC-EDFA.

Means for Solving the Problems

In order to solve the above-described problems, an optical amplifier according to the present invention achieves high speed by improving or eliminating slow components of response specific to an EDF, which is caused by a slow time constant of the recombination of erbium ions.

An optical amplifier according to claim 1 at least includes: an input monitor means; an optical amplification means; and a control means for performing feed-forward control in order to control amplification of the optical amplification means using the input monitor means, and the optical amplifier using the feed-forward control, wherein an overshoot signal is used for the amplification control.

The "optical amplification means" is an amplification means which is excited by light or electrons, makes output light strength greater than input light strength, and includes an optical amplification medium.

The "input monitor means" is a means for monitoring an electronic signal or an optical signal including strength information of input light into the optical amplifier.

The "feed-forward control" means control in which a controlled object is driven by an output control signal in accordance with a strength of a signal being input into the controlled object as well.

As described in FIG. 12, the "overshoot signal" means a control signal indicating a higher value than a steady level transitionally. Here, a steady level is control signal strength at the time when one second or more has passed after the start of applying the control signal. "Transitionally" means time within 100 microseconds from the start of applying the signal.

An optical amplifier according to claim 2 is the optical amplifier according to claim 1, wherein the control means includes an overshoot generation circuit.

The "overshoot generation circuit" generally means an analog circuit or a digital circuit which generates the overshoot signal as an electric circuit.

An optical amplifier according to claim 3 is the optical amplifier according to claim 2, wherein the overshoot generation circuit is a PID circuit.

As shown in FIG. 9, the "PID circuit" is a circuit which produces the amount of control signal determined by a linear combination of three components, a proportional element, a derivation element, and an integral element with respect to an input signal, and thus is capable of generating any waveform in response to the input signal.

An optical amplifier according to claim 4 is the optical amplifier according to any one of claims 1 to 3, wherein an amount of the overshoot signal is 120% or more of a reference value.

As shown in FIG. 12, a peak level of the control signal is defined as a maximum value of the overshoot signal. Also, in this specification, an amount of overshoot signal is defined as a value produced by dividing a peak level of the control signal by the steady level. Also, the reference value has a same meaning as the steady level.

An optical amplifier according to claim 5 is the optical amplifier according to any one of claims 1 to 4, wherein a subsequent stage of the optical amplification means includes a high-speed output variable means.

The "high-speed output variable means" is a means for outputting input light, varying the output by giving a drive signal, and having a high-speed performance in responding to variations of 6 dB before and after giving the drive signal in 10 microseconds or less.

For the high-speed output variable means, for example, a semiconductor amplifier (SOA), an optical external modulator, a high-speed optical variable attenuator, etc., are considered.

An optical amplifier according to claim 6 is the optical amplifier according to claim 5, which further includes an output optical monitor means, wherein the high-speed output variable means is driven using a signal of the output optical monitor means.

The "output light monitor means" is a means for detecting a power level of output light using a part of the output light.

An optical amplifier according to claim 7 is the optical amplifier according to claim 6, wherein the high-speed output variable means is driven by a difference signal between a signal from the input monitor means and a signal of the output optical monitor means. The signal from the input monitor means is a signal including information of the input light strength, and the signal of the output optical monitor means is a signal including information of the output light strength.

An optical amplifier according to claim 8 is the optical amplifier according to any one of claims 5 to 7, wherein the high-speed output variable means is a high-speed variable optical attenuator (VOA).

The "high-speed variable optical attenuator" is a means for attenuating and outputting input light, varying the amount of attenuation by giving a drive signal, and having a high-speed performance in responding to variations of 6 dB before and after giving the drive signal in 10 microseconds or less.

An optical amplifier according to claim 9 is the optical amplifier according to claim 8, wherein the high-speed variable optical attenuator includes an electro-optic effect device, and a drive voltage of the high-speed variable optical attenuator is 40 V or less.

The "electro-optic effect device" means a device having an electro-optic effect, such as Pockels effect, Kerr effect, etc.

Also, the "drive voltage is 40 V or less" means that the voltage difference applied across both ends of the electro-optic effect device is 40 V or less.

Advantages

As described above, by the present invention, it becomes possible to increase a response performance of an optical amplifier.

Figure 1:
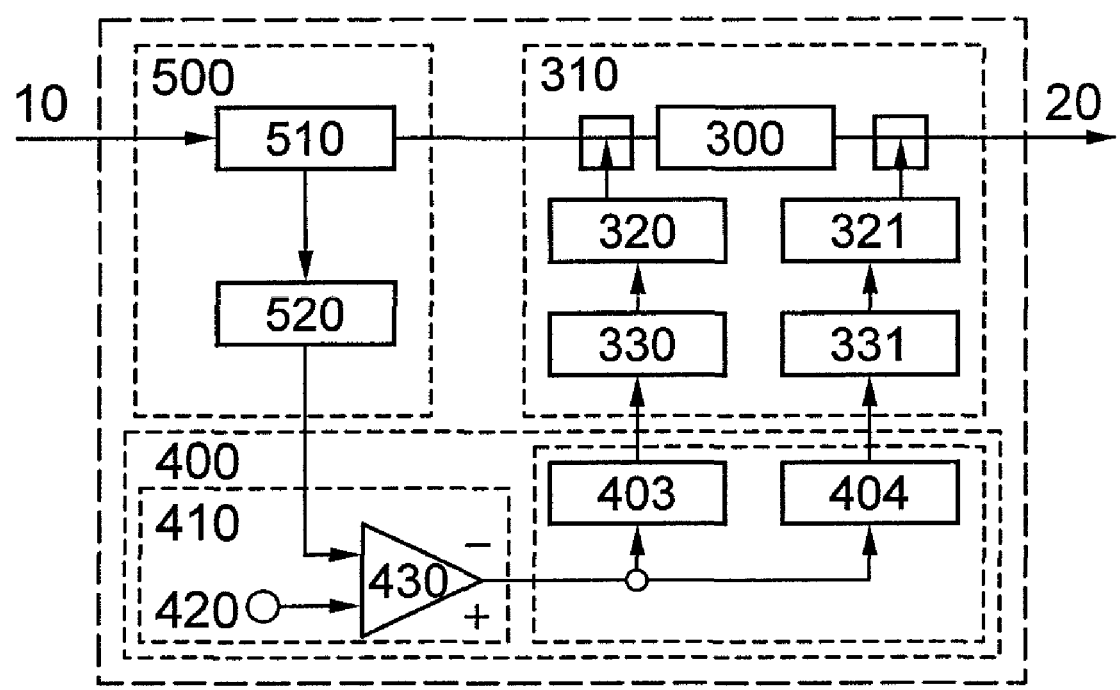
FIG. 1 is an embodiment diagram of an optical amplifier using feed-forward control.

REFERENCE NUMERALS 10 input light
20 output light
300 optical amplification means
310 optical amplification means
320, 321 PUMP-LDs
330, 331 PUMP-LD drive circuits
400 feed-forward control means
403, 404, 405 PID circuits
410 comparison section
420 gain setting terminal
430 OPAMP
500 input monitor means
510, 511 TAP-PDs
520, 521 TIAs
610 high-speed output variable means
620 high-speed variable optical attenuator (VOA)
630 VOA drive circuit
700 output optical monitor means
800 feedback control means
810 OPAMP

BEST MODE FOR CARRYING OUT THE INVENTION

In the following, a description will be given of an embodiment of the present invention on the basis of the drawings.

Embodiment 1

A first embodiment is shown in FIG. 1. An optical amplifier includes an input monitor means 500, an optical amplification means 310, and a feed-forward control means 400.

The input monitor means 500 includes a TAP-type light receiving element 510 and a transimpedance-type electric amplifier (TIA) 520. Also, a part of input light may be branched by an optical coupler, and a level of the input light may be monitored. Moreover, it is possible to input a part of input light branched in a preceding stage of the optical amplifier into an input monitor means (photodiode, TIA) of the optical amplifier.

Also, it is possible to monitor the input light level by separating supervisor control light using a WDM coupler, and transferring an electronic signal equivalently representing the input light level to the input monitor means by the supervisor-control-light processing section. Further, it is possible to monitor the input light level by transferring an electronic signal equivalently representing the input light level from the supervisor-control-light processing section, which has already been processed at a preceding stage of the optical amplifier.

The optical amplification means 310 uses an EDF as an optical amplification medium 300, and includes a PUMP-LD 320 and a PUMP-LD drive circuit 330, and is an example of using the two PUMP-LDs 320. The optical amplification means includes a semiconductor optical amplifier device in addition to an EDF.

In the control of the optical amplification means 300, the PUMP-LD 320 is feed-forward controlled by the output information of the input-side TIA 520 in order to drive the optical amplification means 300 at a high speed in response to a change in the level of input light. A PID circuit section 403 drives the PUMP-LD 320 by producing an overshoot signal of the control signal.

In a differential operational amplifier 430 constituting the control means, the PUMP-LD can be driven by a requested drive current by setting a plus-side input, thereby allowing gain setting.

Figure 2:
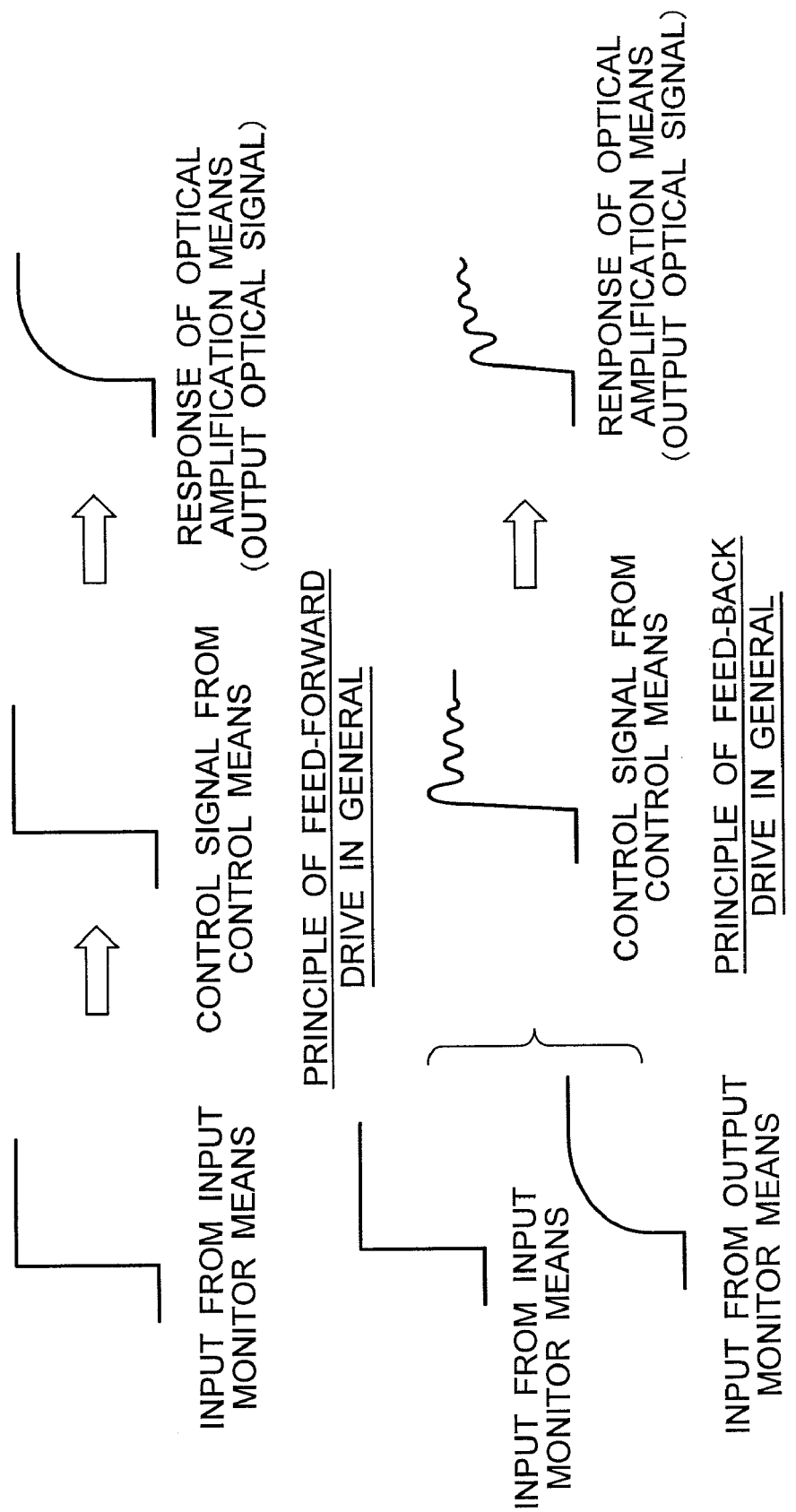
FIG. 2 is a diagram illustrating principles of general feedback and feedforward control.

Next, a detailed description will be given of speeding up by feed-forward control using an overshoot signal. First, a description will be given of general feed-forward control and feed-back control using FIG. 2.

In general feed-forward control, a control signal has nothing but a drive waveform similar to an input signal. Thus, it is impossible to increase the response of an EDF having a low response speed.

On the other hand, in general feed-back control, a difference between an input-signal waveform and an output-signal waveform having a slow response becomes a drive waveform, and thus, in general, becomes a drive waveform having ringing. Accordingly, the response waveform includes a quickened component, but ringing remains, and thus it takes some time until the waveform converges in a stable level. In this control, if control is performed with a time constant restraining the occurrence of ringing, it becomes impossible to improve the response speed of the waveform.

Figure 3:
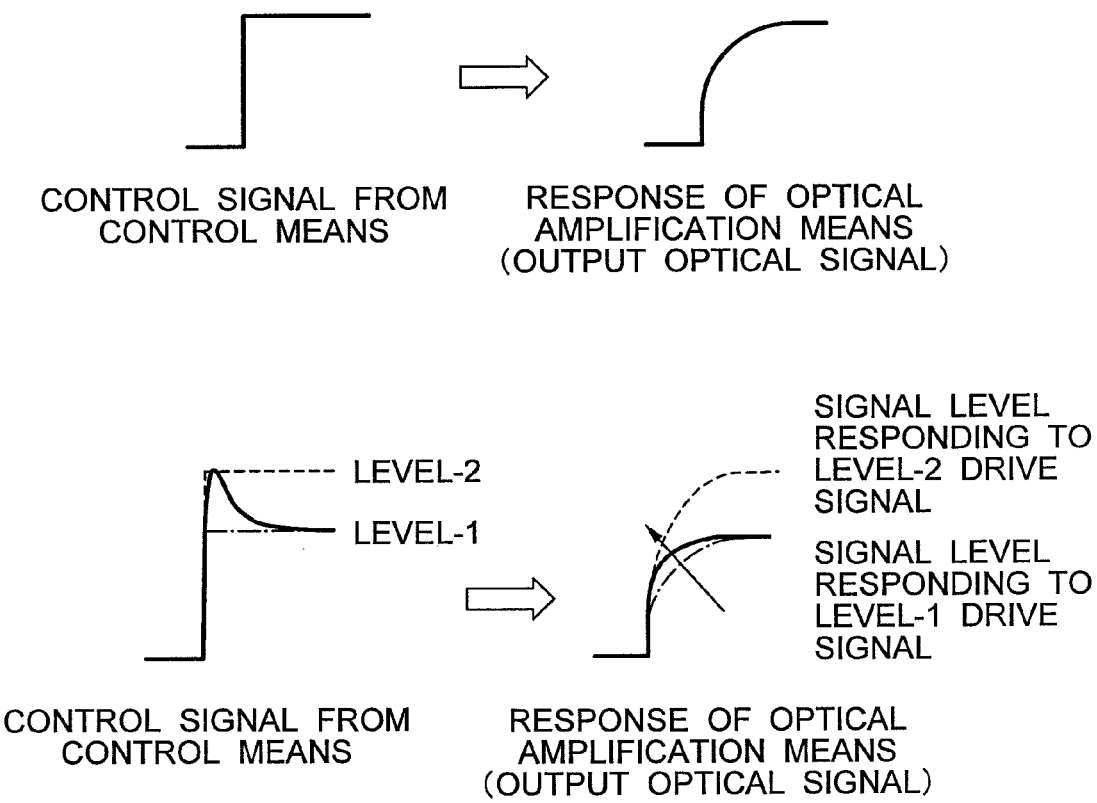
FIG. 3 is a diagram illustrating a principle of overshoot operation in the feed-forward control according to the present invention.

FIG. 3 shows a principle of obtaining a high-speed response characteristic in feed-forward control by driving an EDF using an overshoot signal.

If a control signal from the control means is a rectangular wave, a response having a slow rising time is produced because an EDF has a slow component specific to the EDF. A drive signal level from the control means obtaining a requested EDF response amplitude is assumed to be level-1, and a drive signal level higher than that is assumed to be level-2. When driven by the level-2, a large EDF-response amplitude is produced as shown in FIG. 3.

If the control signal has a waveform which overshoots level-2, and then stably falls to level-1, the EDF rises with a response corresponding to level-2, and then has a response amplitude corresponding to level-1. Accordingly, it becomes possible to increase the speed of the EDF by the overshoot.

Figure 4:
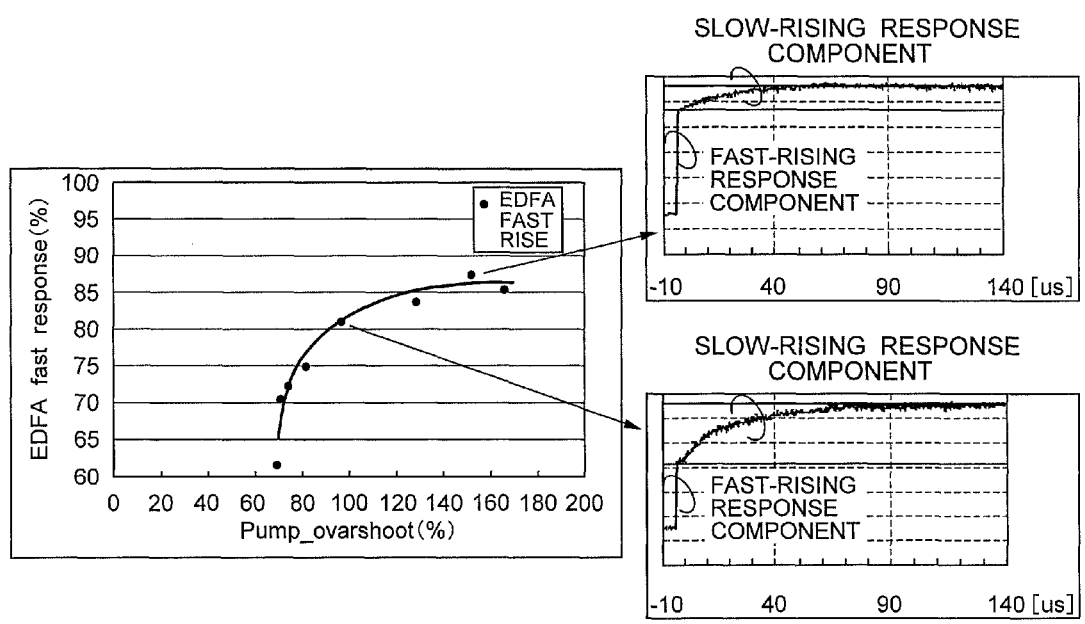
FIG. 4 is a diagram illustrating a relationship between an amount of overshoot and response speed of EDF.

FIG. 4 shows a result, obtained by an experiment, of an amount of overshoot defined by the ratio of a peak level of the control signal to a steady level, and the ratio of fast component in the response amplitude of the EDF. By increasing the amount of overshoot, the response speed of the EDF is improved.

This shows a phenomenon in which a ratio of slow response component of the EDF decreases, and the response speed of the EDF increases. If the amount of overshoot becomes 120% or more, the response tends to be saturated. This means that if the amount of overshoot is increased to 120% or more, a sufficient effect of increasing response can be obtained.

Figure 9:
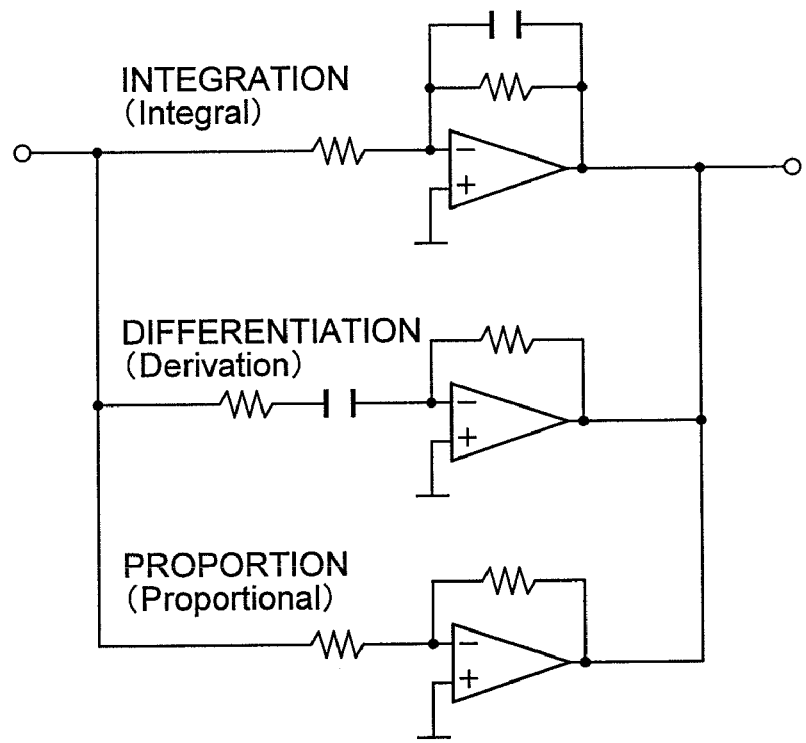
FIG. 9 is an exemplary diagram of a configuration of a PID circuit.

As shown in FIG. 9, in order to generate the amount of this overshoot, for example, a PID circuit in which the amount of a control signal is determined by a linear combination of a proportional element (P), a derivation element (D), and an integral element (I) with respect to an input signal, is provided. Thus, any waveform can be generated with respect to an input signal.

A requested overshoot control signal is created by suitably adjusting individual circuit constants of the three elements, and the control signal of the optical amplification means is made to be an overshoot signal, so that it becomes possible to improve the slow response performance specific to the optical amplification means.

Further, it is possible to employ a digital method in which an overshoot waveform responding to input is stored in a memory, an input monitor value is read, and a necessary overshoot waveform is drawn from the memory to be converted into a control signal.

Next, a description will be given of conditions and an experiment result in the configuration shown in FIG. 1. The employed EDF has an erbium concentration of $7.9 \times 10^{24}$ m$^{-3}$ and a length of 15 m, and thus is a typical EDF.

The wavelength of the PUMP-LD is 0.98 µm, the power of one unit is +23.5 dBm, and pumping is performed both forward and backward. In this regard, the current driving the PUMP-LD had a steady value of 370 mA, and an overshoot current of 140% was used. The response characteristic of the EDF at that time is the data of an overshoot of 140% illustrated in FIG. 4. The gain of the entire amplifier is set to 25 dB.

A measurement result of the response characteristic on this condition is the response waveform at the time when an amount of overshoot is 140% in FIG. 4.

The measurements were made using a light source having a wavelength of 1550 µm, and light input having a stepwise increase of −8 dBm is used on a reference level of −14 dBm. This becomes 6 dB as a fluctuation band of input light amplitude. This fluctuation band simulates a state in which the number of WDM input light into the optical amplifier varies to four times in a stepwise manner.

As is understood from the figure, the speed of rising time defined by 10% to 90% can be increased to 10 microseconds.

Embodiment 2

Figure 5:
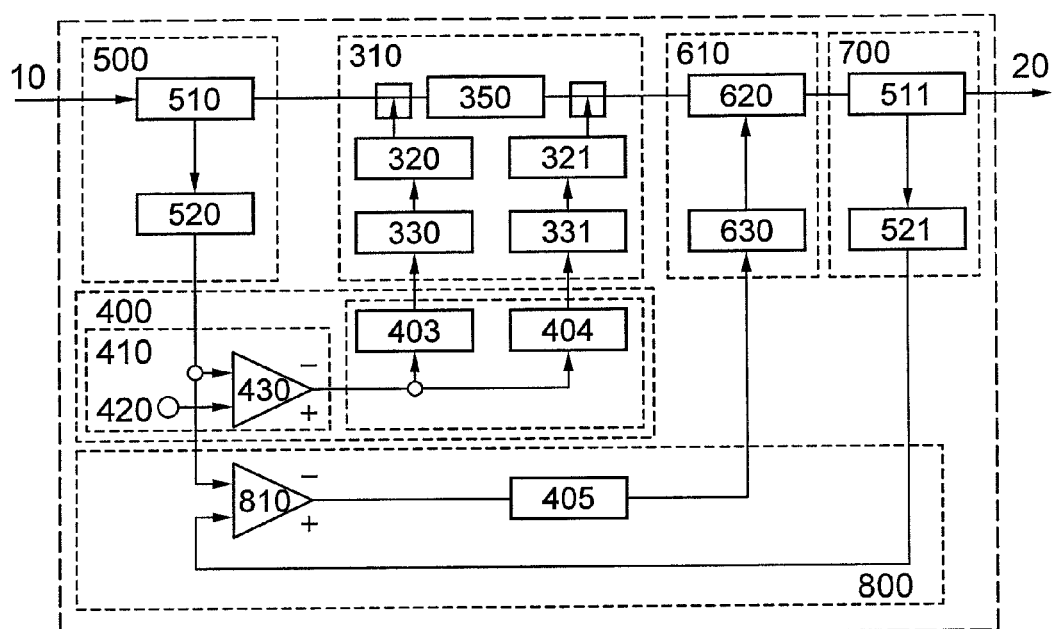
FIG. 5 is an embodiment diagram of an optical amplifier using feed-forward control and feedback control.

A second embodiment is shown in FIG. 5. The optical amplifier includes an input monitor means 500, an optical amplification means 310, and a feed-forward control means 400, a high-speed output variable means 610, an output light monitor means 700, and a feed-back control means 800. The input monitor means 500 includes a TAP-type light receiving element 510 and a transimpedance-type electric amplifier (TIA) 520.

The optical amplification means 310 includes an EDF as an optical amplification medium 300, a PUMP-LD 320 and a PUMP-LD drive circuit 330, and is an example of using the two PUMP-LDs 320.

The output-light monitor means 700 has a same configuration as that of the input-light monitor means 500.

The high-speed output variable means 610 includes a high-speed variable optical attenuator (VOA) 620 and a VOA drive circuit 630. In this regard, a high-speed variable amplifier, such as a semiconductor amplifier, may be used as a high-speed output variable means.

Figure 6:
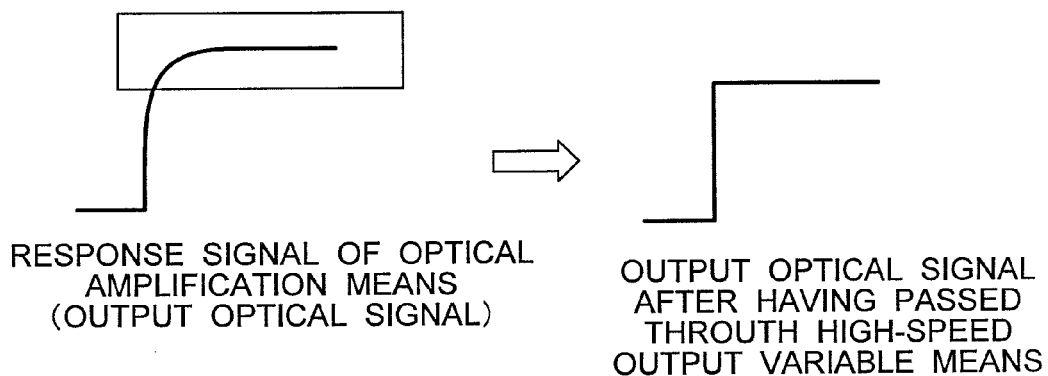
FIG. 6 is a diagram illustrating a principle of an effect of introducing a high-speed output variable means.

Next, a description will be given of a principle of achieving high-speed response characteristic using a high-speed output variable means using FIG. 6. The high-speed output variable means eliminates a slow response component of the EDF (a portion enclosed by a quadrilateral in the figure), and shapes the response waveform into a rectangular wave so that only an originally fast-rising component of the EDF remains, making it possible to achieve a response speed of one microsecond or less.

In the control of the optical amplification means 300, the PUMP-LD 320 is feed-forward controlled by the output information of the input-side TIA 520 in order to drive the optical amplification means 300 at a high speed in response to a change in the level of input light. A PID circuit section 403 drives the PUMP-LD 320 by producing an overshoot signal of the control signal.

In a differential operational amplifier 430 constituting the control means, the PUMP-LD can be driven by a requested drive current by setting a plus-side input, thereby allowing the EDF setting.

In the control of the high-speed variable optical attenuator (VOA) 620, the VOA 620 is feed-back controlled by a difference signal of the output information of the input-side TIA 520 and the output information of the output-side TIA 521.

In this regard, the PID circuit section 405 in the feedback control means 800 can change the drive signal of the VOA 620 into an overshoot signal.

Further, it is possible to employ auto-level control, in which the VOA 520 is feedback controlled such that the output becomes a constant level on the basis of the output information of the output-side TIA 521. Also, it is possible to insert a VOA input light monitor immediately before the VOA 520, and to perform feed-forward control by a light strength signal obtained from the VOA input light monitor. Moreover, it is possible to change the drive signal of the VOA 620 into an overshoot signal in the feed—forward control of the VOA 520.

Figure 7:
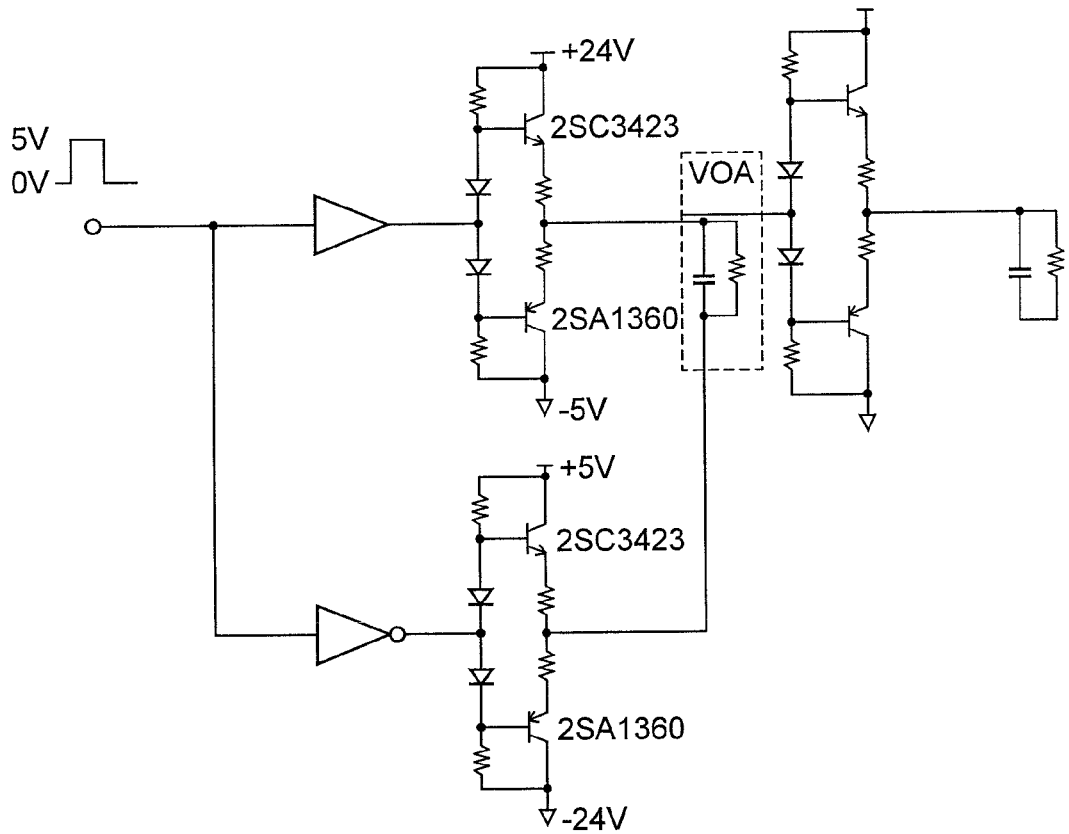
FIG. 7 is an exemplary diagram of a configuration of a VOA drive circuit.

Next, a description is given of a drive circuit of the VOA. FIG. 7 shows an example of the drive circuit of a VOA. Two same circuits are vertically disposed, and a drive voltage at a plus side and a minus side are applied to both ends of the VOA so that a large amplitude drive is achieved as an example. For devices used, 2SC3423 and 2SA1360 illustrated in the figure are used as commercially available large current transistors.

Figure 8:
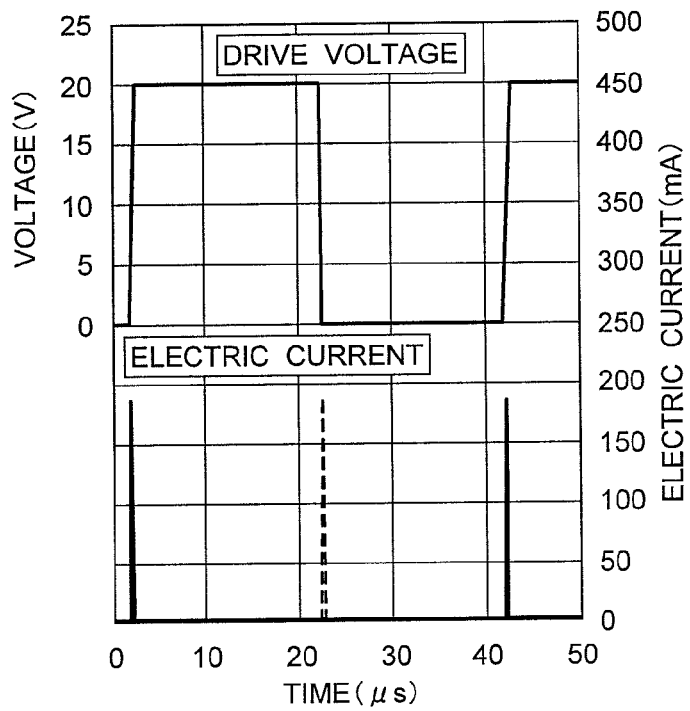
FIG. 8 is an exemplary diagram of a simulation result of the VOA drive circuit.

FIG. 8 shows a simulation waveform of a drive waveform in the present circuit. Note that the result is only of the circuit at the plus side. The same result having a different polarity is obtained at the minus side. Thus, the amplitude applied to the VOA becomes 40 V. From this simulation result, it is understood that a drive output of one microsecond or less has a limit of 40 V at most.

Accordingly, for a VOA, it is understood that it becomes necessary to have a VOA having a drive voltage of 40 V or less, and having a high-speed response performance.

Accordingly, an electro-optic type is promising in that a VOA of this type has a high-speed performance. Further, for a VOA using a low voltage of 40 V or less, for example, a PLZT-type high-speed VOA in international publication NO. WO/2005/121876 is promising.

For a VOA, an example of an electro-optic type has been shown. However, any principle, such as a mechanical type, an MEMS type, a magneto-optic type, a liquid crystal type, an electroabsorption type, a thermo-optic type, etc., may be used as long as a VOA attenuates and outputs input light, varies the amount of attenuation by being given a drive signal, and has a high-speed performance in responding to variations of 6 dB before and after giving the drive signal in 10 microseconds or less.

With this configuration, the PUMP-LD 320 is driven at a high speed in response to input light having a rectangular wave, and the output waveform of the EDF 350 having fast response components and slow response components is obtained. The slow response-speed element is removed by the VOA 620, output light 20 is shaped into a rectangular wave, and a requested high-speed response is obtained.

On the other hand, the amount of slow-response components to be deleted by the VOA 620 decreases, and thus the drive voltage of the VOA 620 decreases, thereby the response speed of the VOA 620 can be increased. BY these synergistic effects, it becomes possible to shape an output waveform, and to obtain a response of one microsecond or less.

A description will be given of conditions and an experiment result in the configuration shown in FIG. 5. The employed EDF has an erbium concentration of $7.9 \times 10^{24}$ $m^{-3}$ and a length of 15 m, and thus is a typical EDF.

The wavelength of the PUMP-LD is 0.98 µm, the power of one unit is +23.5 dBm, and pumping is performed both forward and backward. In this regard, the current driving the PUMP-LD had a steady value of 370 mA, and an overshoot current of 140% was used. The response characteristic of the EDF at that time is the data of an overshoot of 140% illustrated in FIG. 4.

The VOA having a drive voltage amplitude of 30 V and a response speed of one microsecond or less is applied. In this regard, the gain of the entire amplifier is set to 20 dB.

Figure 10:
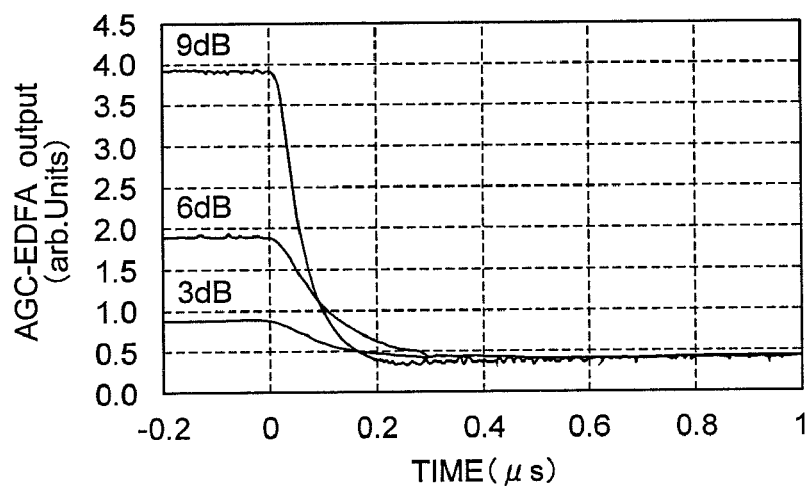
FIG. 10 is a response waveform chart of a falling portion.
Figure 11:
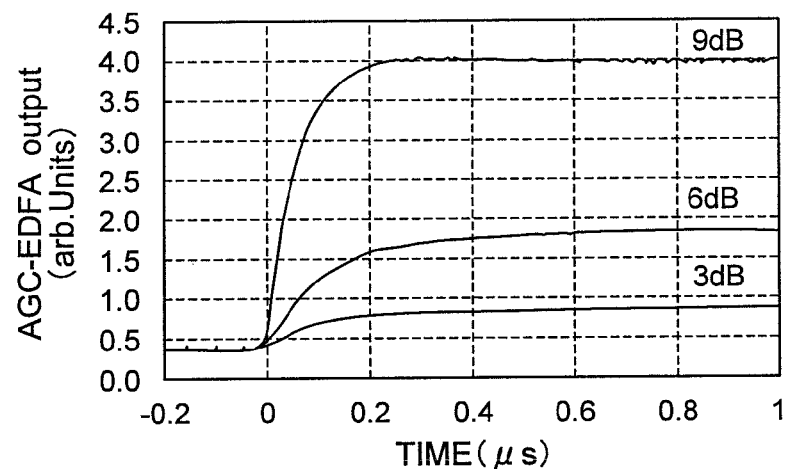
FIG. 11 is a response waveform chart of a rising portion.
Figure 12:
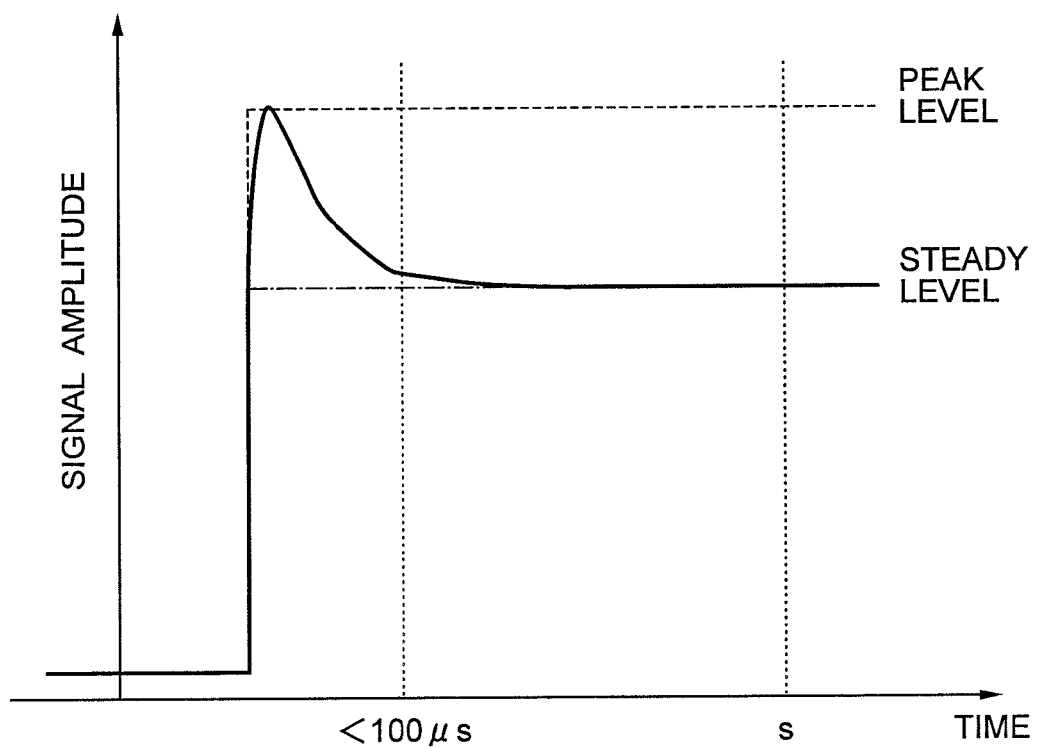
FIG. 12 is an explanatory diagram of an overshoot signal.

Measurement results of the response characteristic on this condition are shown in FIG. 10 and FIG. 11. FIG. 10 shows a response characteristic in a falling section, and FIG. 11 shows a response characteristic in a rising section.

The measurements were made using a light source having a wavelength of 1550 µm, and three kinds of input, light input having stepwise increases of −5 dBm, −8 dBm, and −11 dBm are used to a reference level of −14 dBm. This becomes individually 9 dB, 6 dB, and 3 dB as fluctuation bands of an input light amplitude, which correspond to response waveform levels in the figure. The fluctuation bands simulate states in which the number of WDM input light into the optical amplifier varies to eight times, four times, and two times in a stepwise manner.

As is understood from the figure, in the individual input-light fluctuation bands, high-speed characteristics of one microsecond or less are obtained for both the rising response time and the falling response time.

In this regard, the present invention is not limited to the above-described embodiments. It is possible to make variations without departing from the spirit and scope of the invention.

INDUSTRIAL APPLICABILITY

By the present invention, it is possible to achieve an optical amplifier capable of high-speed response, and thus it is possible to use the optical amplifier as an optical communication apparatus.

The invention claimed is:
1. An optical amplifier comprising:
an input monitor means;
an output optical monitor means;
an optical amplification means; and
a control means for performing feed-forward control in order to control amplification of the optical amplification means using the input monitor means, and the optical amplifier using the feed-forward control, wherein an overshoot signal is used for the amplification control,
wherein a subsequent stage of an optical amplification medium includes a high-speed output variable means, and
wherein the high-speed output variable means is driven using a signal of the output optical monitor means.

2. The optical amplifier according to claim 1, wherein the control means includes an overshoot generation circuit.

3. The optical amplifier according to claim 2, wherein the overshoot generation circuit is a PID circuit.

4. The optical amplifier according to claim 3, wherein an amount of the overshoot signal is 120% or more of a reference value.

5. The optical amplifier according to claim 3, wherein an amount of the overshoot signal is 120% or more of a reference value.

6. The optical amplifier according to claim 3, wherein the high-speed output variable means is driven by a difference signal between a signal from the input monitor means and the signal of the output optical monitor means.

7. The optical amplifier according to claim 2, wherein an amount of the overshoot signal is 120% or more of a reference value.

8. The optical amplifier according to claim 2, wherein an amount of the overshoot signal is 120% or more of a reference value.

9. The optical amplifier according to claim 2, wherein the high-speed output variable means is driven by a difference signal between a signal from the input monitor means and the signal of the output optical monitor means.

10. The optical amplifier according to claim 1, wherein an amount of the overshoot signal is 120% or more of a reference value.

11. The optical amplifier according to claim 1, wherein the high-speed output variable means is driven by a difference signal between a signal from the input monitor means and the signal of the output optical monitor means.

12. The optical amplifier according to claim 11, wherein the high-speed output variable means is a high-speed variable optical attenuator.

13. The optical amplifier according to claim 12, wherein the high-speed variable optical attenuator includes an electro-optic effect element, and a drive voltage of the high-speed variable optical attenuator is 40 V or less.

14. The optical amplifier according to claim 1, wherein the high-speed output variable means is a high-speed variable optical attenuator.

15. The optical amplifier according to claim 14, wherein the high-speed variable optical attenuator includes an electro-optic effect element, and a drive voltage of the high-speed variable optical attenuator is 40 V or less.

* * * * *